(12) United States Patent
Kwon et al.

(10) Patent No.: US 12,240,475 B2
(45) Date of Patent: Mar. 4, 2025

(54) APPARATUS AND METHOD FOR CONTROLLING POWER OF VEHICLE

(71) Applicants: HYUNDAI MOTOR COMPANY, Seoul (KR); Kia Corporation, Seoul (KR)

(72) Inventors: Soon Myung Kwon, Suwon-si (KR); Seong Cheol Park, Seongnam-si (KR); Tae Hwan Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 143 days.

(21) Appl. No.: 17/469,170

(22) Filed: Sep. 8, 2021

(65) Prior Publication Data
US 2022/0348213 A1 Nov. 3, 2022

(30) Foreign Application Priority Data
Apr. 28, 2021 (KR) .................. 10-2021-0055184

(51) Int. Cl.
B60W 50/029 (2012.01)
B60W 50/02 (2012.01)
B60W 50/023 (2012.01)

(52) U.S. Cl.
CPC ...... B60W 50/029 (2013.01); B60W 50/0205 (2013.01); B60W 50/023 (2013.01)

(58) Field of Classification Search
CPC ............ B60W 50/023; B60W 50/029; B60W 50/0205
See application file for complete search history.

(56) References Cited

U.S. PATENT DOCUMENTS

| 11,050,235 B2* | 6/2021 | Bae ......................... H02H 1/04 |
| 2017/0324270 A1 | 11/2017 | Wang et al. |
| 2018/0339726 A1* | 11/2018 | Kumagai ............... H02P 27/06 |
| 2019/0077401 A1* | 3/2019 | Katagiri ................ B60W 10/18 |
| 2022/0266777 A1* | 8/2022 | Naizghi .................. B60L 50/66 |
| 2022/0306131 A1* | 9/2022 | Rammert ............ B60R 16/0232 |
| 2023/0076114 A1* | 3/2023 | Kanekawa ............ B60W 10/08 |

FOREIGN PATENT DOCUMENTS

| KR | 10-2015-0011283 A | 1/2015 |
| KR | 10-2016-0128013 A | 11/2016 |
| KR | 10-1786469 B1 | 10/2017 |
| KR | 10-2019-0108801 A | 9/2019 |

* cited by examiner

*Primary Examiner* — Angela Y Ortiz
*Assistant Examiner* — Torrence S Marunda, II
(74) *Attorney, Agent, or Firm* — MORGAN, LEWIS & BOCKIUS LLP

(57) ABSTRACT

An apparatus for controlling power of a vehicle includes a first controller that generates a control signal for controlling output of power supplied to at least one vehicle load, and a second controller that determines whether the first controller is in a normal operation status by monitoring the first controller, and controls a power switch to maintain output of the control signal to the at least one vehicle load when the first controller is not in the normal operation status.

16 Claims, 16 Drawing Sheets

APPARATUS AND METHOD FOR CONTROLLING POWER OF VEHICLE

CROSS-REFERENCE TO RELATED APPLICATION

This application claims the benefit of priority to Korean Patent Application No. 10-2021-0055184, filed on Apr. 28, 2021 in the Korean Intellectual Property Office, the entire contents of which are incorporated herein by reference.

TECHNICAL FIELD

The present disclosure relates to an apparatus and a method for controlling power of a vehicle.

BACKGROUND

A power supply of a vehicle controls an ON or OFF status of power required for each load of the vehicle. In general, a micro controller unit (MCU) included in the power supply of the vehicle receives a switch input from the outside or an input signal through CAN communication and operates an intelligent power switch (IPS) to control the ON or OFF status of the load. The MCU may operate the IPS by making serial peripheral interface (SPI) communication and using a general-purpose input/output pin.

When the MCU of the power supply of the vehicle is failed or when a regulator to supply power to the MCU is failed, the IPS is switched off. In this situation, power is not supplied to the load of the vehicle. Accordingly, the failure of the MCU or the regulator interrupts the normal driving of a vehicle, especially, an autonomous vehicle, which is controlled by an electronic system, thereby causing an accident. In addition, there may be required a technology of controlling power supplied to each load of the vehicle to prevent a secondary accident while the vehicle evacuates to a safety zone, even if the MCU or the regulator is failed, when driving control is not transferred to a driver in the autonomous driving status.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus and a method for controlling power of a vehicle, enabling an autonomous vehicle to normally travel by supplying power to a load of the vehicle, even if a power controller or a regulator is failed.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for controlling power of a vehicle may include a first controller that generates a control signal for controlling output of power supplied to at least one vehicle load, and a second controller that determines whether the first controller is in a normal operation status by monitoring the first controller and controls a power switch to maintain output of the control signal to the at least one vehicle load when the first controller is not in the normal operation status.

The second controller may determine that the first controller is not in the normal operation status when the first controller is reset due to a status of "Watch dog fail" and thus initialized.

The apparatus for controlling power of the vehicle may further include a first regulator that supplies power to at least one of the first controller or the second controller, and a second regulator that supplies the power to the second controller.

The second controller may determine that the first controller is not in the normal operation status when the first regulator is not in the normal operation status.

The second controller may operate by receiving the power from the first regulator when the second regulator does not operate, and may determine that the first controller is in the normal operation status.

The second controller may receive the control signal from the first controller and may control the power switch, in response to the control signal, when the first controller is in the normal operation status.

The power switch is controlled to be turned on or off in response to the control signal.

According to another aspect of the present disclosure, a method for controlling power of a vehicle may include generating, by a first controller, a control signal for controlling output of power supplied to at least one vehicle load, determining, by a second controller, whether the first controller is in a normal operation status, by monitoring the first controller, and controlling, by the second controller, a power switch to maintain output of the control signal to the at least one vehicle load, when the first controller is not in the normal operation status.

The determining of whether the first controller is in the normal operation status by monitoring the first controller may include determining that the first controller is not in the normal operation status when the first controller is reset due to a status of "Watch dog fail" and thus initialized.

The method may further include supplying, by the first regulator, the power to at least one of the first controller or the second controller, and supplying, by a second regulator, the power to the second controller.

The determining of whether the first controller is in the normal operation status by monitoring the first controller may include determining that the first controller is not in the normal operation status when the first regulator is not in the normal operation status.

The determining of whether the first controller is in the normal operation status by monitoring the first controller may include operating the second controller by receiving the power from the first regulator when the second regulator does not operate, and determining that the first controller is in the normal operation status.

The determining of whether the first controller is in the normal operation status by monitoring the first controller may include receiving the control signal from the first controller and controlling the power switch, in response to the receiving control signal, when the first controller is in the normal operation status.

The method may further include turning on and off the power switch in response to the control signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
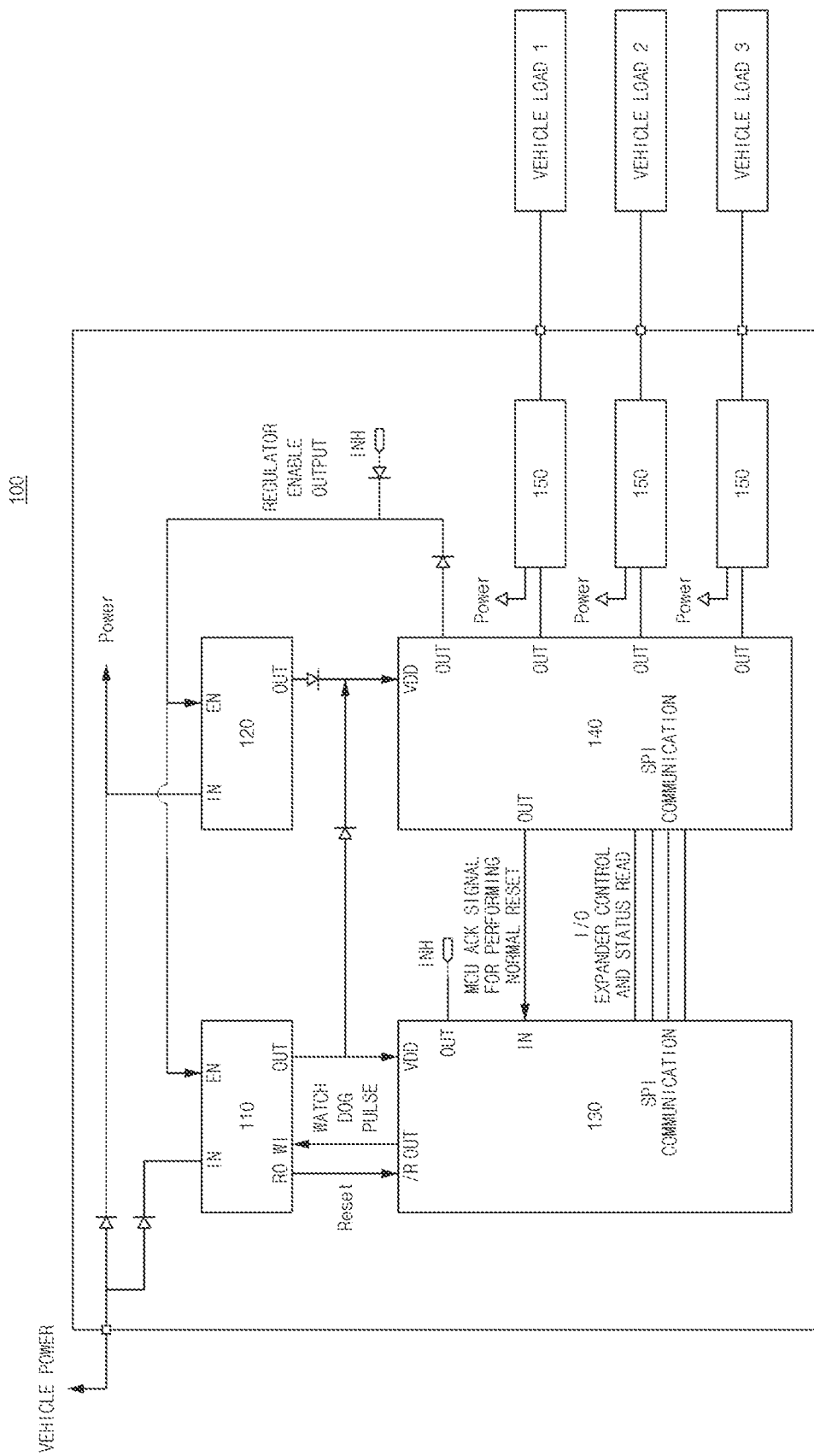
FIG. 1 is a block diagram illustrating the configuration of an apparatus for controlling power of a vehicle, according to an exemplary embodiment of the present disclosure.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an exemplary embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of an apparatus for controlling power of a vehicle, according to an exemplary embodiment of the present disclosure.

As illustrated in FIG. 1, according to an exemplary embodiment of the present disclosure, an apparatus (vehicle power control apparatus) 100 for controlling power of a vehicle may include a first regulator 110, a second regulator 120, a first controller 130, a second controller 140, and a power switch 150.

The first regulator 110 may supply power to at least one of the first controller 130 or the second controller 140.

The second regulator 120 may supply power to the second controller 140.

The first controller 130 may include a micro controller unit (MCU), and may generate a control signal for controlling the operation of the power switch 150. According to the embodiment, the control signal may include a signal (IPS ON or IPS OFF) for an ON or OFF status of the power switch 150 connected with an output port of the second controller 140 such that the output of the power supplied to the load of the vehicle is controlled.

The first controller 130 and the second controller 140 of the apparatus 100 according to an exemplary embodiment of the present disclosure may be a processor (e.g., computer, microprocessor, CPU, ASIC, circuitry, logic circuits, etc.). Each controller may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

In addition, the first controller 130 may communicate with the second controller 140 to transmit the control signal to the second controller 140, and may read the output status of the second controller 140. According to an exemplary embodiment, the first controller 130 may communicate with the second controller 140 through a Serial Peripheral Interface (SPI) communication, inter-integrated circuit (I2C) communication, or a chip-to-chip communication scheme.

In addition, the first controller 130 may output a watch dog pulse at a specific time such that a normal operation of the first controller 130 is determined, and may be reset when the first controller 130 is not normally performed. The first controller 130 may output a regulator enable output signal to each of the first regulator 110 and the second regulator 120 (to a pin "EN" of each regulator) through an input terminal "INH", such that the first regulator 110 and the second regulator 120 normally operate.

The second controller 140 may include an input/output expander (ICE), and may determine whether the first controller 130 operates normally (in a normal operation status) by monitoring the first controller 130. When the first controller 130 does not operate normally, the second controller 140 may control the power switch to maintain the output of a control signal to at least one vehicle load.

According to an exemplary embodiment, the second controller 140 may maintain the output status of the control signal before a time point at which the first controller 130 is determined as not being in a normal operation status. In addition, the second controller 140 may output the control signal to the power switch 150 when the first controller 130 is in the normal operation status.

The second controller 140 may determine that the first controller 130 is not in the normal operation status, when the first controller 130 is reset due to a status of "Watch dog fail" and thus initialized. In this case, the status of "Watch dog fail" refers to a status in which a normal watch dog pulse is not generated, as the first controller 130 does not operate normally. In addition, the second controller 140 may determine that the first controller 130 is not in the normal operation status, when the first controller 130 does not operate yet. In addition, the second controller 140 may determine that the first controller 130 is not in the normal operation status, when the first regulator 110 does not operate yet.

In addition, the second controller 140 may determine that the first controller 130 is not in the normal operation status, when the second regulator 120 does not operate yet.

In addition, the second controller 140 may receive a normal reset signal (an acknowledgement signal for performing a normal reset), which is in a Low level, from the first controller 130, when the first controller 130 is in the normal operation status, and may output, to the first controller 130, the normal reset signal (the acknowledgement signal for performing the normal reset), which is in the Low level. The second controller 140 may receive the normal reset signal (the acknowledgement signal for performing the normal reset), which is in a High level, from the first controller 130, when the first controller 130 is not in the normal operation status, and may output, to the first controller 130, the normal reset signal (the acknowledgement signal for performing the normal reset), which is in the High level, again. The second controller 140 may initialize the communication with the first controller 130, when outputting the normal reset signal in the High level.

The second controller 140 may output a regulator enable output signal to each of the first regulator 110 and the second regulator 120 (to a pin "EN" of each regulator), such that the first regulator 110 and the second regulator 120 normally operate.

At least one power switch (IPS) 150 may be provided such that at least one output port of the second controller 140 is connected with one side of the at least one power switch 150. In addition, at least one vehicle load (vehicle load 1, vehicle load 2, and vehicle load 3) may be connected with an opposite side of the power switch 150.

The ON or OFF status of the power switch 150 is controlled in response to the control signal, such that power is supplied or not supplied to the vehicle load.

Figure 2:
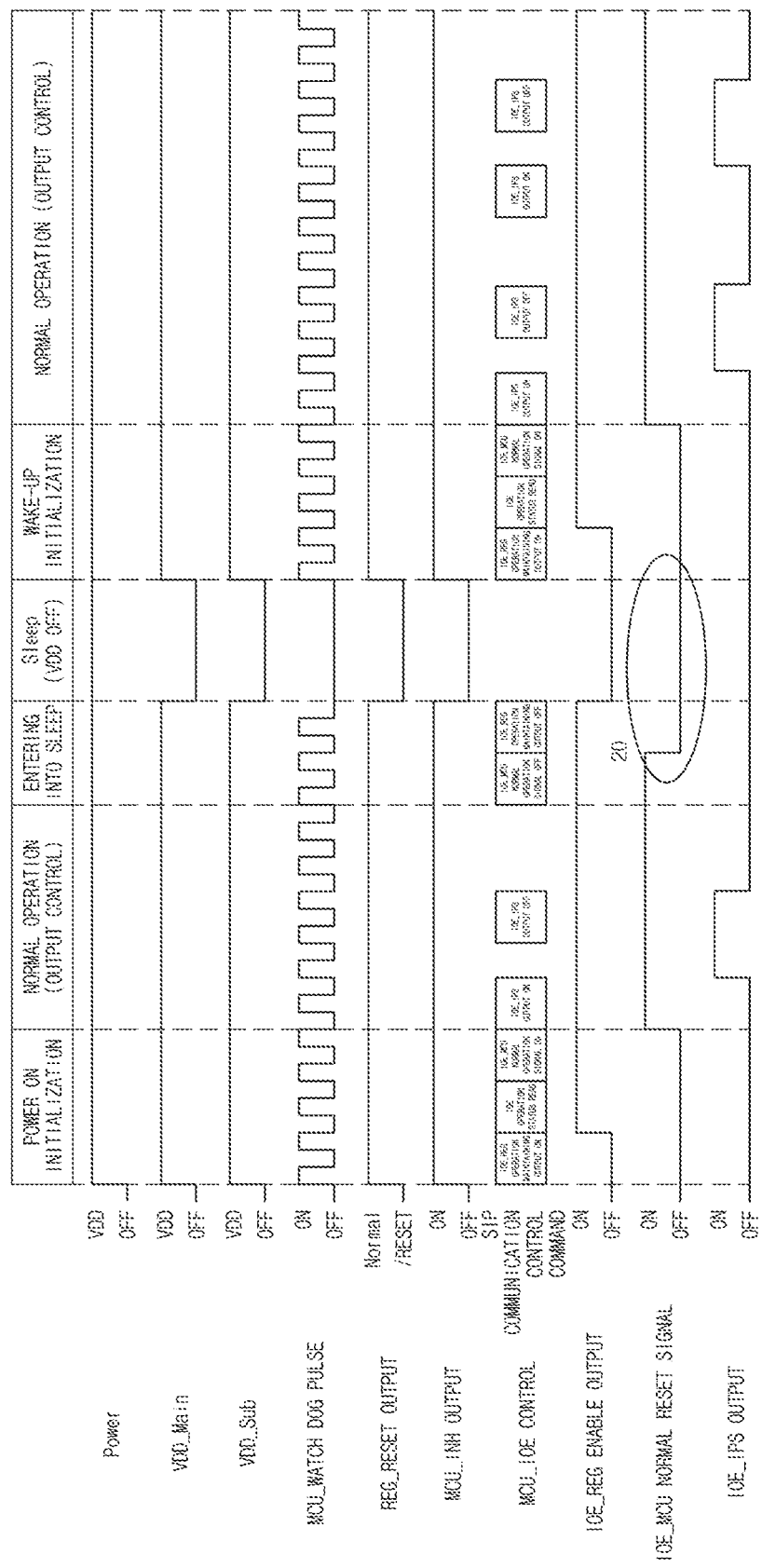
FIG. 2 is a view illustrating a signal of an apparatus for controlling power of a vehicle, which is in a normal operation status, according to an exemplary embodiment of the present disclosure.

FIG. 2 is a view illustrating a signal of an apparatus for controlling power of a vehicle, which is in a normal operation status, according to an exemplary embodiment of the present disclosure.

As illustrated in FIG. 2, when power is supplied to the vehicle power control apparatus 100 (Power ON), the first regulator 110 may supply power to any one of the first controller 130 and the second controller 140, and the second regulator 120 may supply power to the second controller 140. In this case, the first controller 130 may output the watch dog pulse (in an ON status) to determine the normal operation status. The first controller 130 may output an enable output signal for the normal operation of the first regulator 110 and the second regulator 120 (MCU_INH: ON). In addition, the first controller 130 may generate a control signal for controlling the operation of the power switch 150 through the SPI communication. The second controller 140 may output an enable output signal (in an ON status) for the normal operation of the first regulator 110 and the second regulator 120, may output a normal reset signal, which is in an ON status (High level), to the first controller 130, and may output a signal (in an ON status) for controlling the power switch 150.

Further, when the vehicle power control apparatus 100 enters into a sleep mode, the first regulator 110 and the second regulator 120 are prevented from outputting power (VDD_Main: OFF; VDD_Sub: OFF) such that the first controller 130 and the second controller 140 do not operate. Accordingly, the first controller 130 does not output the enable output signal for the normal operations of the first regulator 110 and the second regulator 120 (MCU_INH: OFF), and even the second controller 140 does not output the enable output signal for the normal operation of the first regulator 110 and the second regulator 120 (OFF).

The first controller 130 may output the normal reset signal, which is in an OFF status (Low level), to the second controller 140, when normally entering into the sleep mode. The second controller 140 may receive the normal reset signal (in the Low level) from the first controller 130 and may output the received normal reset signal (in the Low level) to the first controller 130 again. Accordingly, in the normal sleep mode, the second controller 140 may enable the first controller 130 to output the normal reset signal in the OFF status (Low level; see reference numeral 20).

FIGS. 3A to 6B are views schematically illustrating the operation of an apparatus for controlling power of a vehicle, according to an exemplary embodiment of the present disclosure.

Figure 3A:
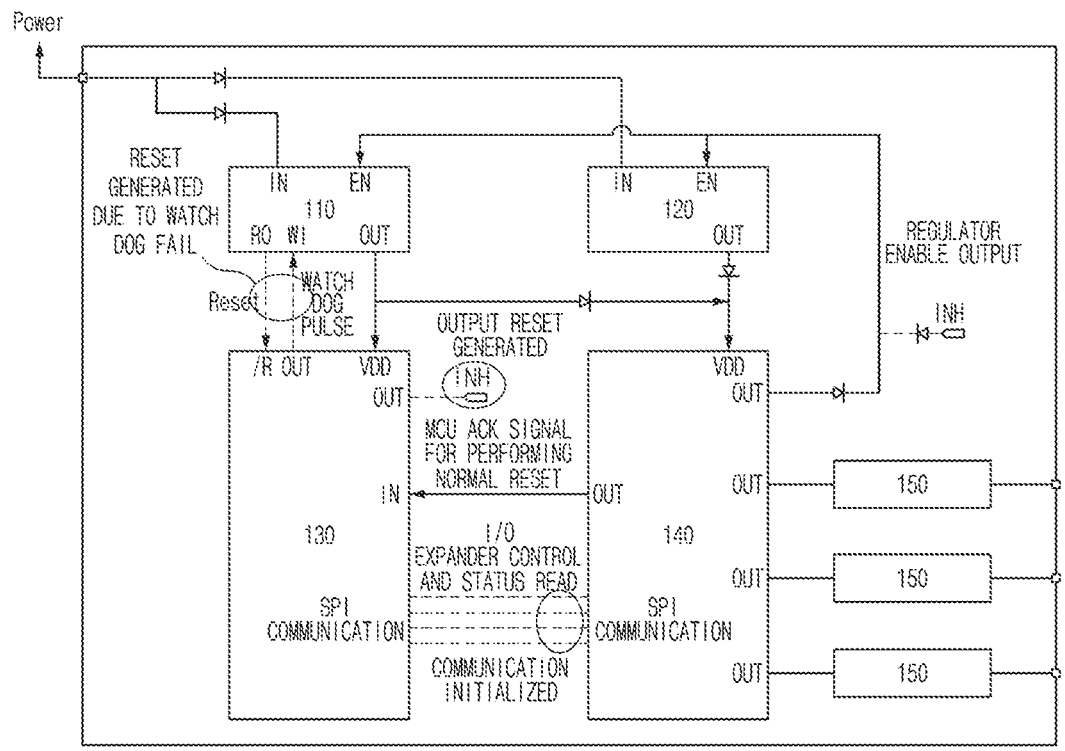
FIGS. 3A to 6B are views schematically illustrating the operation of an apparatus for controlling power of a vehicle, according to an exemplary embodiment of the present disclosure.
Figure 3B:
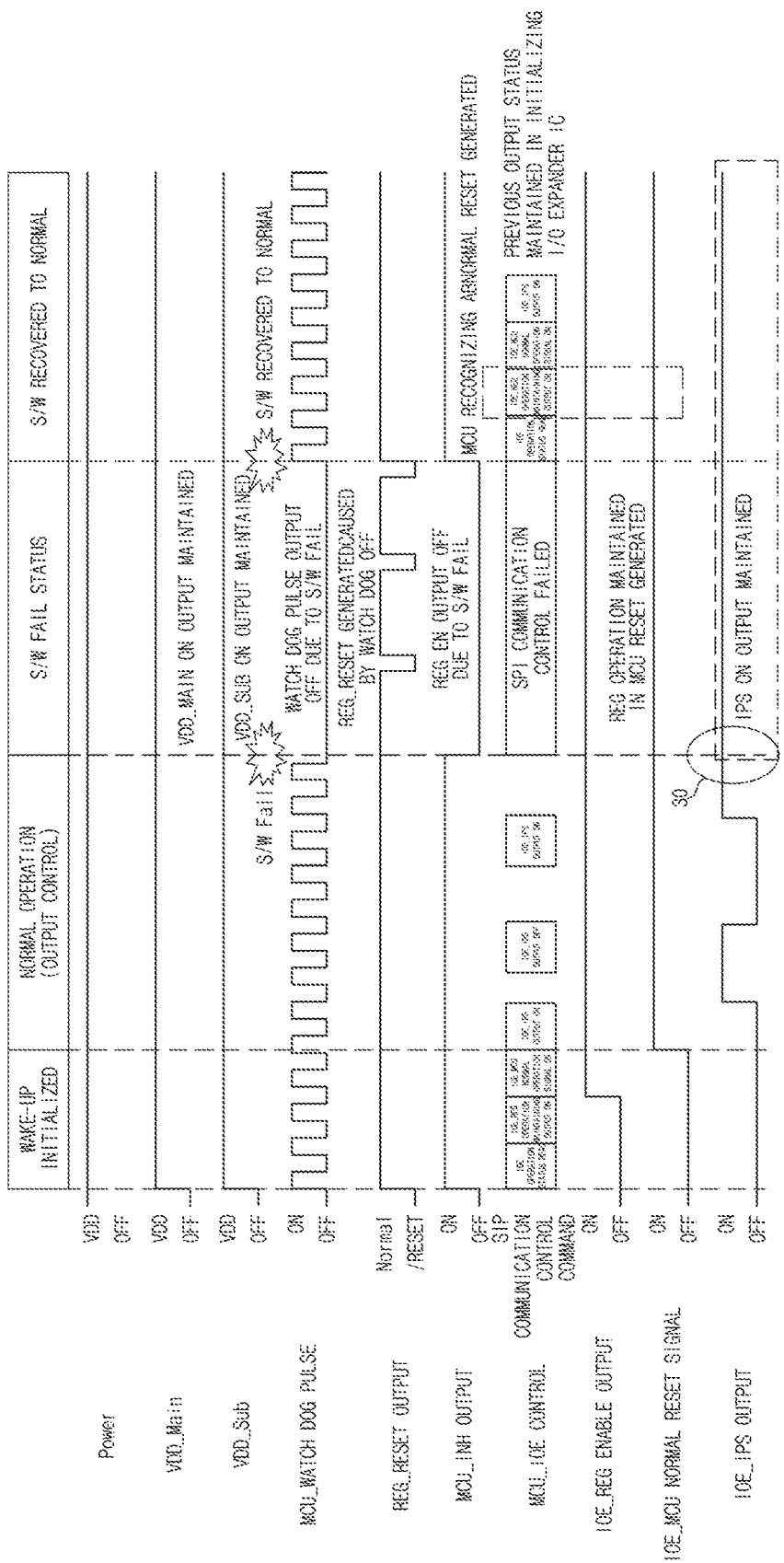

As illustrated in FIGS. 3A and 3B, when a reset is generated due to the watch dog fail and when the first controller 130 is in the normal operation status, the first controller 130 may output a normal reset signal (IOE_MCU normal reset signal) in the OFF (Low level) status. However, when the reset is generated due to the watch dog fail, but the first controller 130 is not in the normal operation status, the first controller 130 may output the normal reset signal in the ON status (High level).

Therefore, according to an exemplary embodiment of the present disclosure, the second controller 140 may determine whether the first controller 130 is in the normal operation status, based on the normal reset signal (IOE_MCU normal reset signal) output to the first controller 130.

The second controller 140 may determine that the first controller 130 is in the normal operation status, when the normal reset signal output to the first controller 130 is in the OFF status (Low level). In addition, the second controller 140 determines that the first controller 130 is not in the normal operation status, when the normal reset signal output to the first controller 130 is the ON status (High level), and when the communication with the first controller 130 is initialized.

The second controller 140 may normally operate by receiving power from the second regulator 120, when the second controller 140 determines that the first controller 130 is not in the normal operation status. In addition, the second controller 140 may maintain the output status of the control signal before a time point at which the first controller 130 is determined as not being in the normal operation status (see reference numeral 30).

Accordingly, even if the first controller 130 is not in the normal operation status, the power control status for the vehicle load may be maintained. According to an exemplary embodiment, the second controller 140 may perform a control operation such that power is supplied to the vehicle load even if the first controller 130 is not in the normal operation status, when the control signal before the time point at which the first controller 130 is determined as not being in the normal operation status is "IPS ON". However, the second controller 140 may perform a control operation such that power is not supplied to the vehicle load even if the first controller 130 is not in the normal operation status, when the control signal before the time point at which the first controller 130 is determined as not being in the normal operation status is "IPS OFF".

The power control status for the vehicle load is maintained even if the first controller 130 is not in the normal operation status, thereby improving driving safety in, especially, an autonomous vehicle.

Figure 4A:
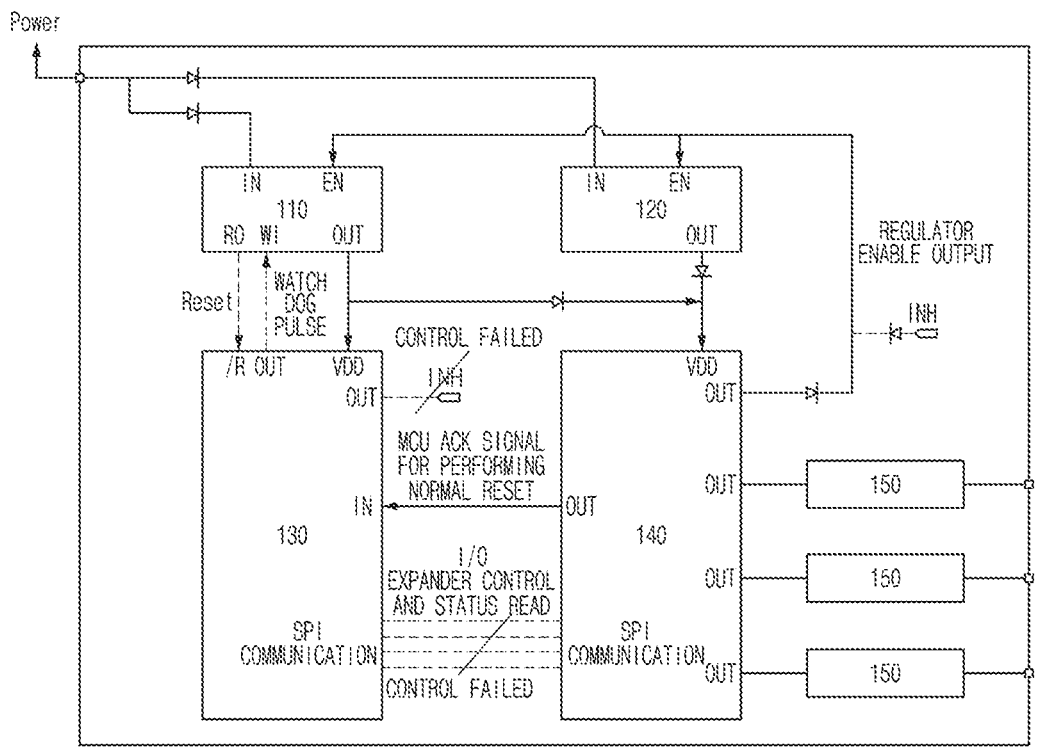
Figure 4B:
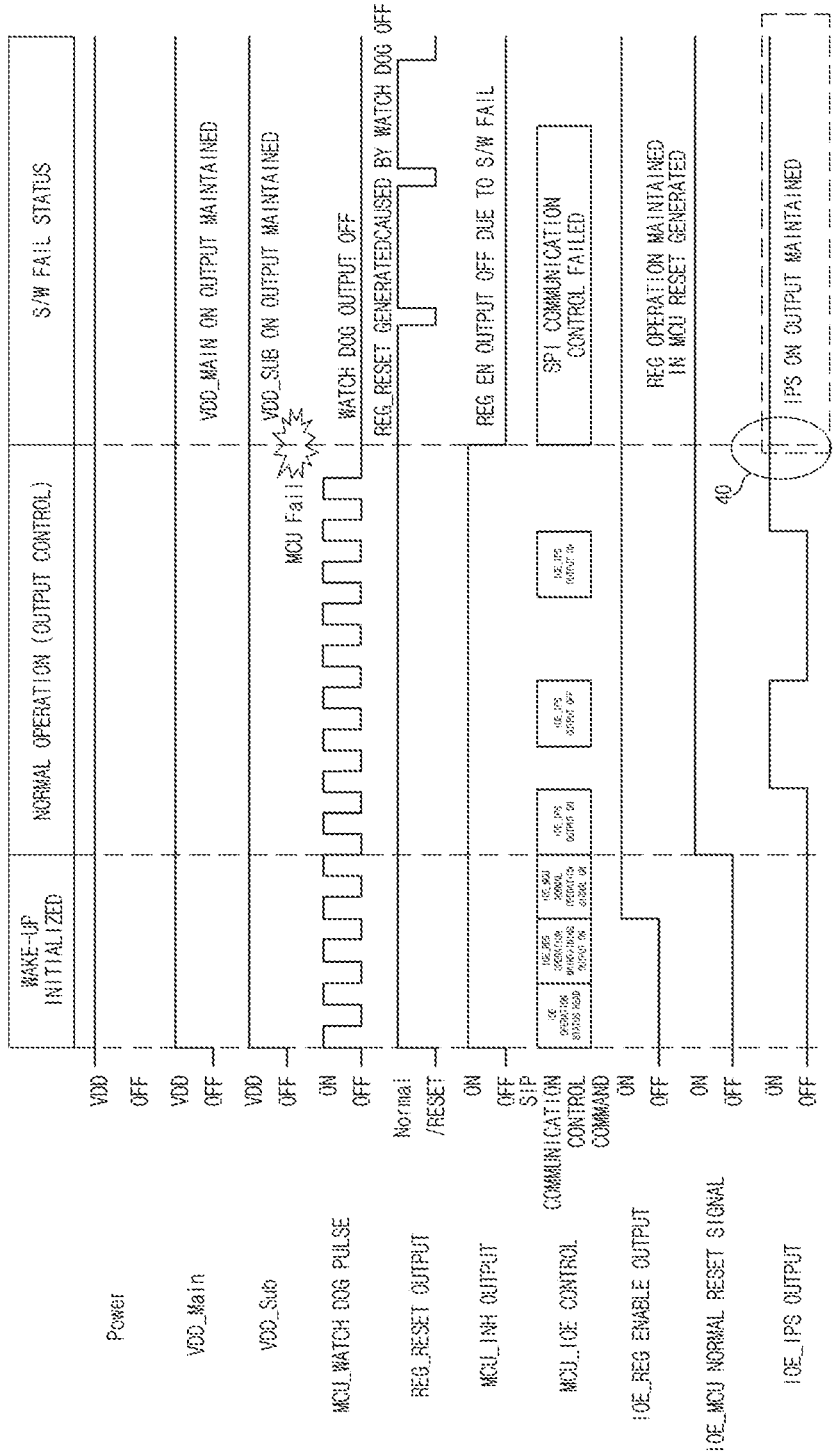

As illustrated in FIGS. 4A and 4B, when the first controller 130 does not operate, the first controller 130 does not communicate with the second controller 140, so the second controller 140 may determine that the first controller 130 is not in the normal operation status.

The second controller 140 may normally operate by receiving power from the second regulator 120, when the second controller 140 determines that the first controller 130 is not in the normal operation status. In addition, the second controller 140 may maintain the output status of the control signal before the time point at which the first controller 130 is determined as not being in the normal operation status (see reference numeral 40).

Accordingly, even if the first controller 130 is not in the normal operation status, the power control status for the vehicle load may be maintained. According to an exemplary embodiment, the second controller 140 may perform a control operation such that power is supplied to the vehicle load even if the first controller 130 is not in the normal operation status, when the control signal before the time point at which the first controller 130 is determined as not being in the normal operation status is "IPS ON". However, the second controller 140 may perform a control operation such that power is not supplied to the vehicle load even if the first controller 130 is not in the normal operation status, when the control signal before the time point at which the first controller 130 is determined as not being in the normal operation status is "IPS OFF".

Figure 5A:
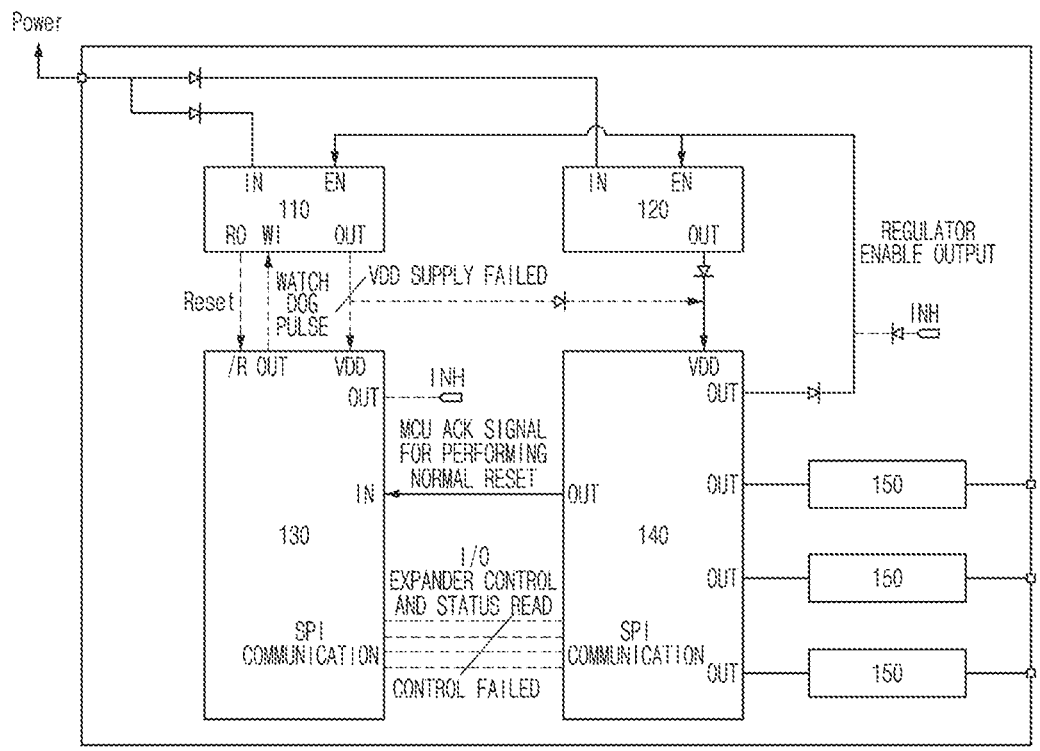
Figure 5B:
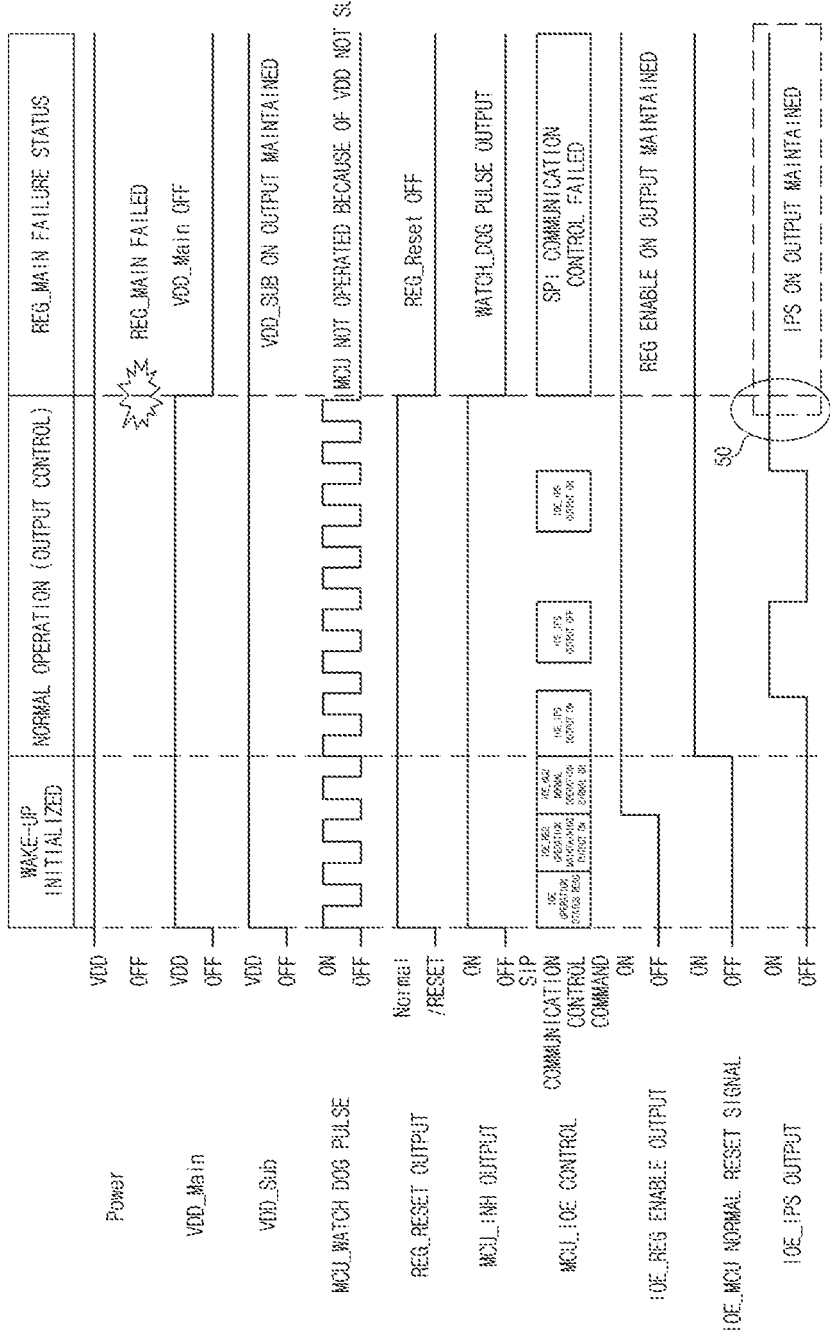

As illustrated in FIGS. 5A and 5B, when the first regulator 110 does not operate, the first regulator 110 may not supply power to the first controller 130. Accordingly, the first controller 130 may not communicate with the second controller 140, and the second controller 140 may determine that the first controller 130 is not in the normal operation status.

The second controller 140 may normally operate by receiving power from the second regulator 120, when determining that the first controller 130 is not in the normal operation status. In addition, the second controller 140 may maintain the output status of the control signal before a time point at which the first controller 130 is determined as not being in the normal operation status.

Accordingly, even if the first controller 130 is not in the normal operation status, the power control status for the vehicle load may be maintained. According to an exemplary embodiment, the second controller 140 may perform a control operation such that power is supplied to the vehicle load even if the first controller 130 is not in the normal operation status, when the control signal before the time point at which the first controller 130 is determined as not being in the normal operation status is "IPS ON". However, the second controller 140 may perform a control operation such that power is not supplied to the vehicle load even if the first controller 130 is not in the normal operation status, when the control signal before the time point at which the first controller 130 is determined as not being in the normal operation status is "IPS OFF".

Figure 6A:
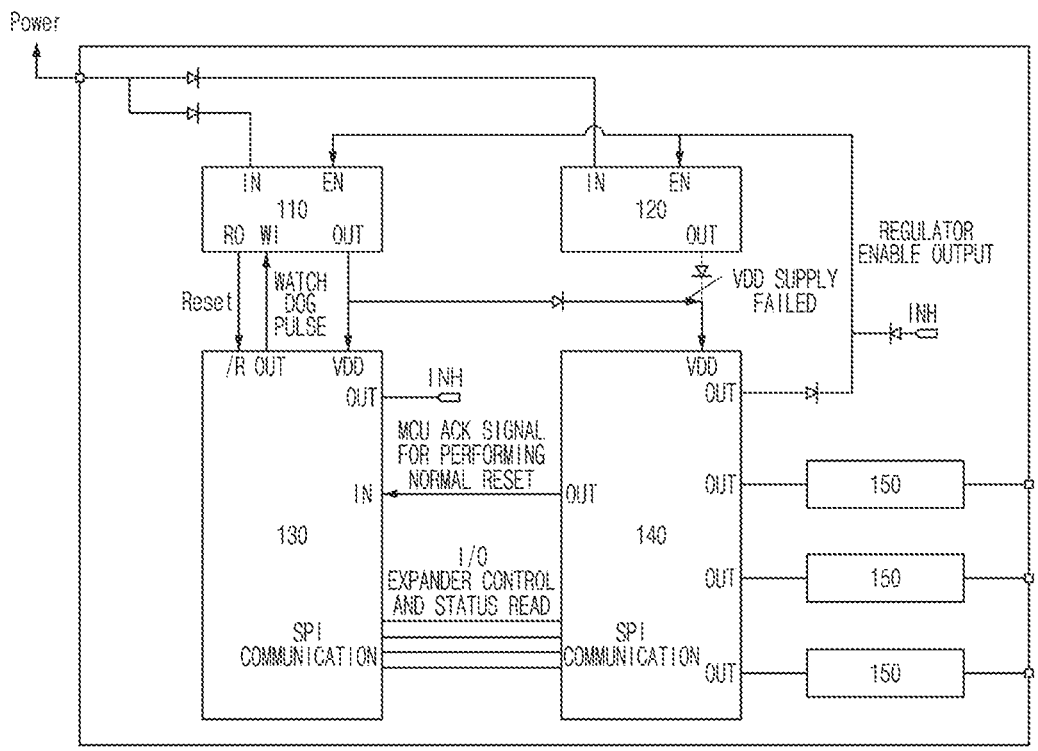
Figure 6B:
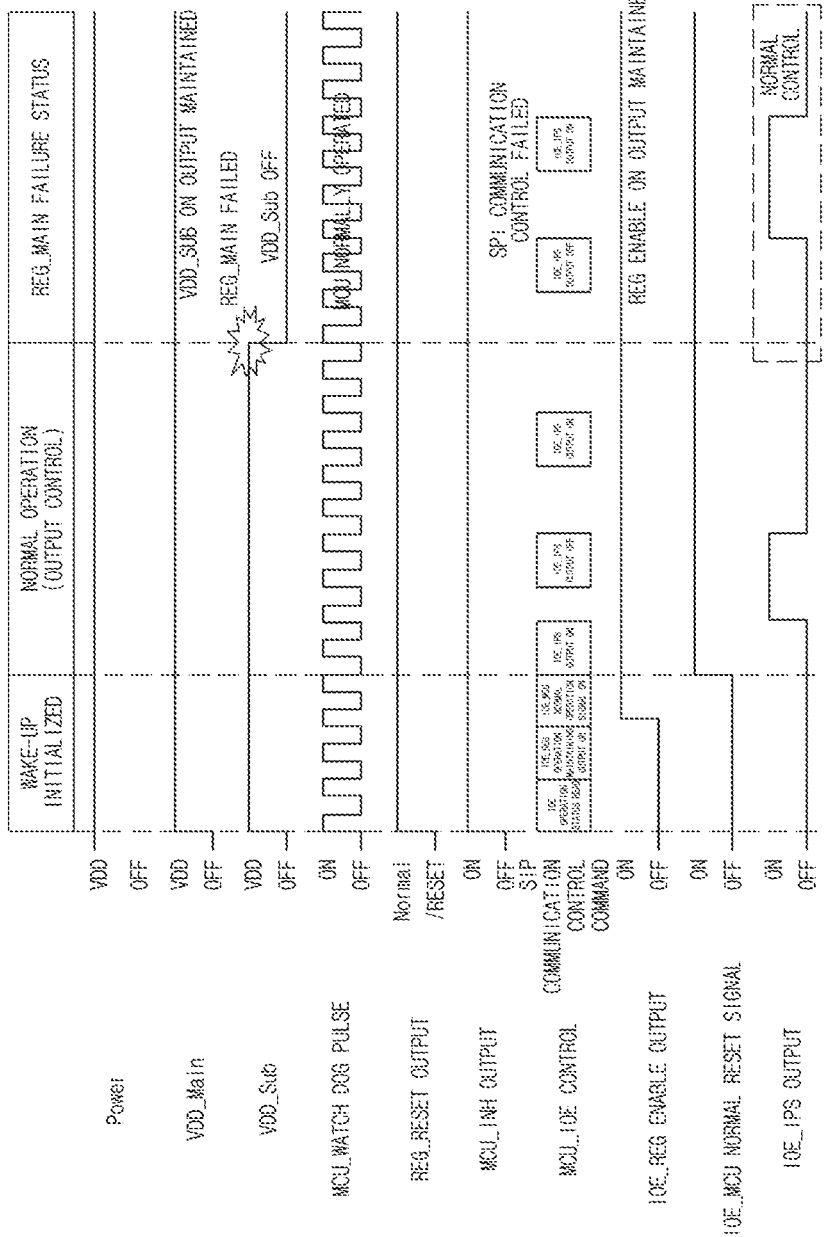

As illustrated in FIGS. 6A and 6B, when the second regulator 120 does not operate, the second regulator 120 may not supply power to the second controller 140 and may receive power output from the first regulator 110.

Even if the second regulator 120 does not operate normally, since the second controller 140 receives power from the first regulator 110, the second controller 140 may normally communicate with the first controller 130, and may determine that the first controller 130 is in the normal operation status.

The second controller 140 may receive a control signal generated from the first controller 130 when determining that the first controller 130 is in the normal operation status, and may control the power switch 150 in response to the received control signal.

FIGS. 7 to 11 are flowcharts illustrating a method for controlling power of a vehicle, according to an exemplary embodiment of the present disclosure.

Figure 7:
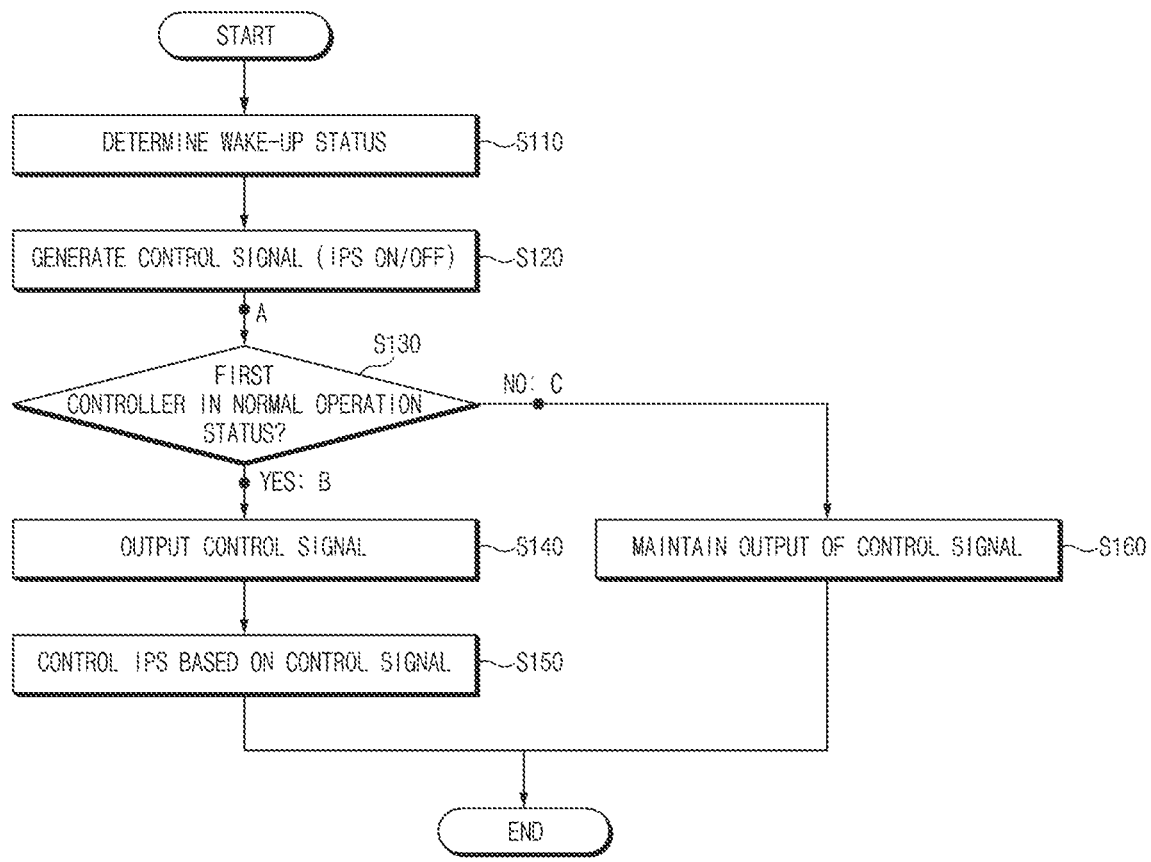
FIGS. 7 to 11 are flowcharts illustrating a method for controlling power of a vehicle, according to an exemplary embodiment of the present disclosure.

As illustrated in FIG. 7, the vehicle power control apparatus 100 may determine that a present status is a wake-up status (S110). In S110, power may be supplied to the vehicle power control apparatus 100. The power may be supplied to the first regulator 110 and the second regulator 120, the first regulator 110 may supply power to any one of the first controller 130 and the second controller 140, and the second regulator 120 may supply power to the second controller 140.

The first controller 130 may generate a control signal (S120). In this case, the control signal may include a signal for controlling the operation of the power switch 150. According to an exemplary embodiment, the control signal may include a signal (IPS ON or IPS OFF) for controlling an ON or OFF status of the power switch 150 connected with the output port of the second controller 140 to control the output of the power supplied to the vehicle load.

The second controller 140 may determine whether the first controller 130 is in the normal operation status (S130). The details of the operation of determining whether the first controller 130 is in the normal operation status in S130 will be described with respect to FIGS. 8 to 11.

Figure 8:
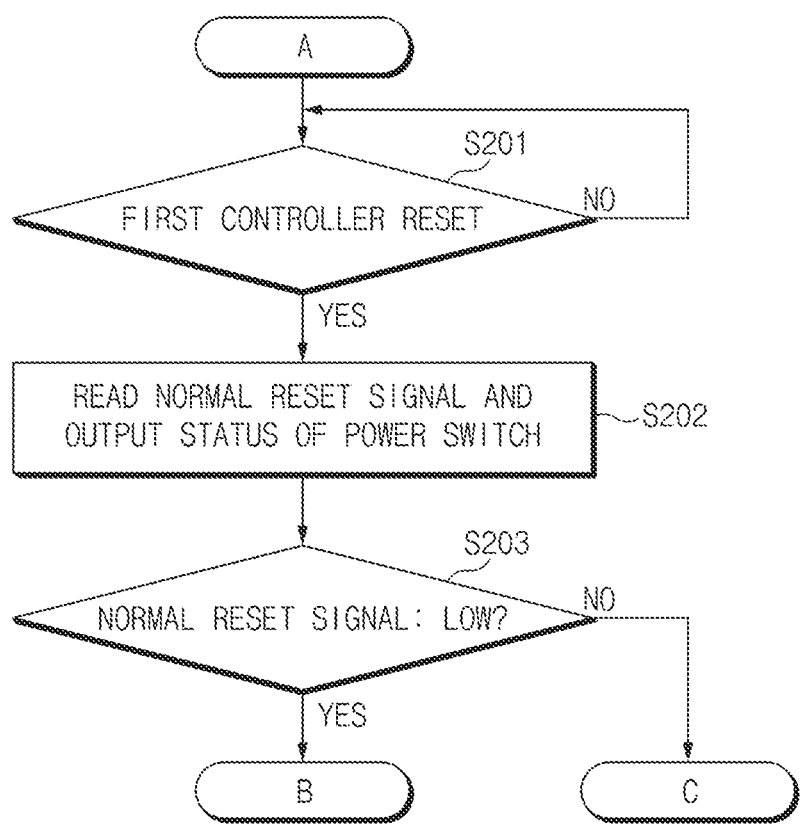

As illustrated in FIG. 8, the first controller 130 may determine whether the reset is generated (S201). In addition, the second controller 140 may read a normal reset signal output from the first controller 130 and an output status of the power switch 150 (S202). When the first controller 130 is in the normal operation status, the second controller 140 may output the normal reset signal in the OFF status (Low level) in S202. When the first controller 130 is not in the normal operation status, the second controller 140 may output the normal reset signal in the ON status (High level). In addition, the second controller 140 may read the output status of the power switch 150 in response to the control signal received from the first controller 130 in S202.

The second controller 140 may determine whether the normal reset signal output to the first controller 130 is in the Low level (S203). The second controller 140 may determine that the first controller 130 is in the normal operation status, when the normal reset signal output to the first controller 130 is in the Low level ("YES") in S203 (go to "B").

Further, the second controller 140 may determine that the normal reset signal is in the High level, when the normal reset signal is not in the Low level in S203. In addition, the second controller 140 determines that the first controller 130 is not in the normal operation status, when the normal reset signal output to the first controller 130 is the High level, and when the communication with the first controller 130 is initialized (go to "C").

Figure 9:
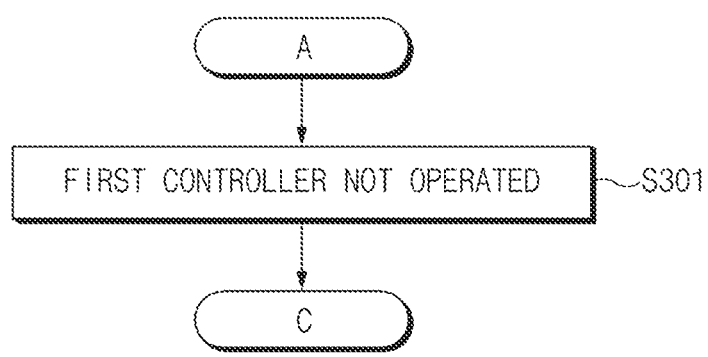

As illustrated in FIG. 9, the second controller 140 may determine whether the first controller 130 is not in the normal operation status, when the first controller 130 does not operate (S301).

Figure 10:
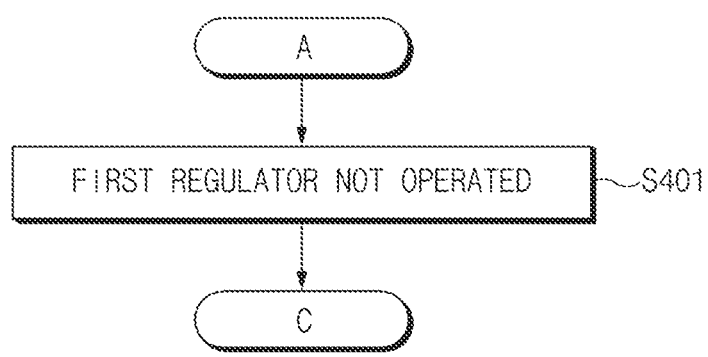

As illustrated in FIG. 10, the second controller 140 may determine that the first regulator 110 does not operate, when failing to receive the power from the first regulator 110 (S401). Since the first regulator 110 does not operate, power is not supplied to the first controller 130. Accordingly, the second controller 140 may determine that the first controller 130 is not in the normal operation status (go to "C").

Figure 11:
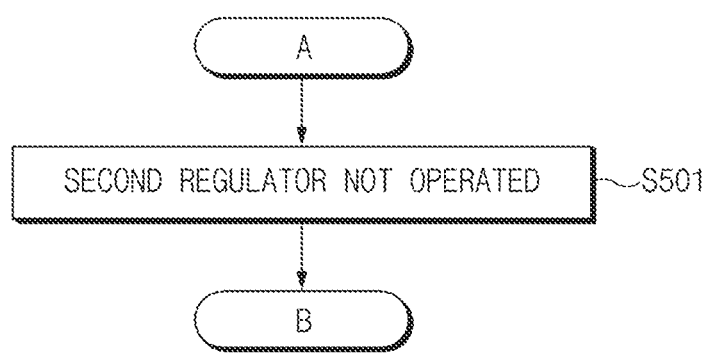

As illustrated in FIG. 11, the second controller 140 may determine that the second regulator 120 does not operate, when failing to receive the power from the second regulator 120 (S501). Since the second controller 140 may receive power from the first regulator 110 even if the second regulator 120 does not operate, the second controller 140 may make normal communication with the first controller 130. The second controller 140 may determine that the first controller 130 is in the normal operation status (go to "B").

When the first controller 130 is determined as being in the normal operation status in S130 of FIG. 7 ("YES"), the second controller 140 may receive a control signal from the first controller 130 and may output the control signal through the output port (S140). In addition, the second controller 140 allows the power switch 150, which is connected with the output port of the second controller 140, to be controlled in response to the control signal (S150).

When the first controller 130 is determined as not being in the normal operation status in S130 ("NO"), the second controller 140 may control the power switch 150 to maintain the output of the control signal to at least one vehicle load (S160). According to an exemplary embodiment, in S160, the second controller 140 may perform a control operation to maintain the output status of the control signal before the time point at which the first controller 130 is determined as not being in the normal operation status.

Figure 12:
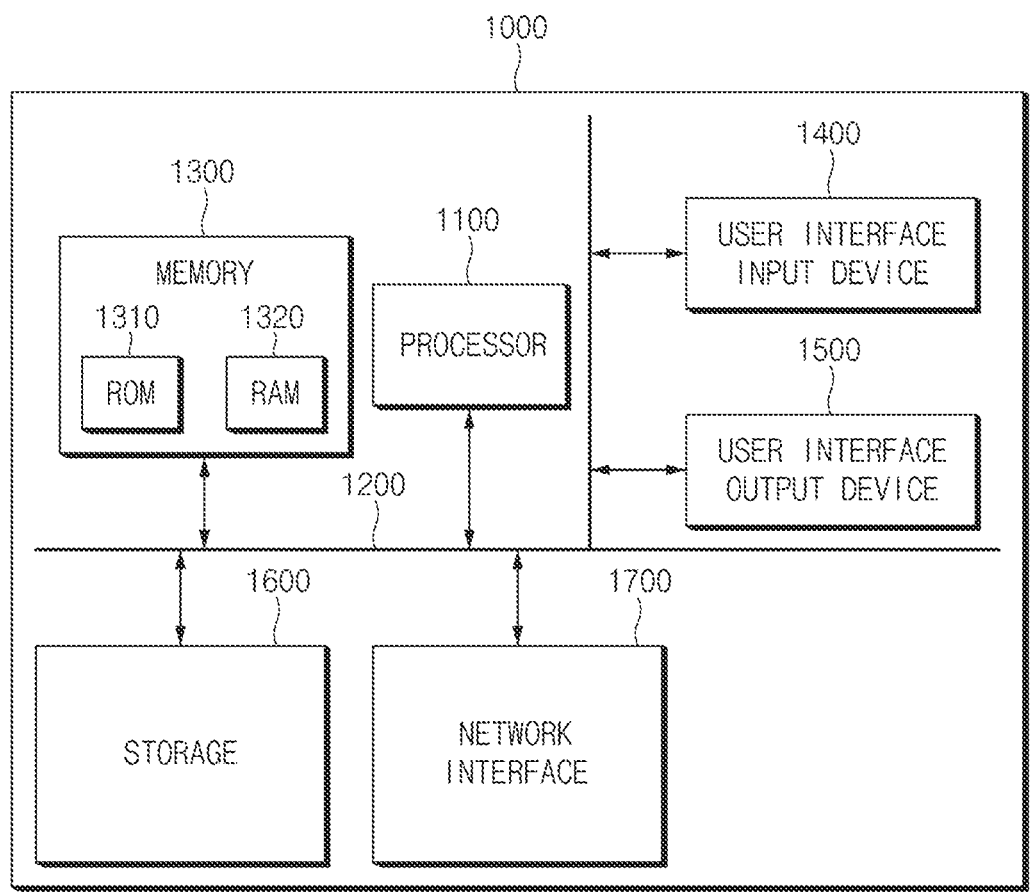
FIG. 12 is a block diagram illustrating a computing system to execute a method, according to an exemplary embodiment of the present disclosure.

FIG. 12 is a block diagram illustrating a computing system to execute a method, according to an exemplary embodiment of the present disclosure.

Referring to FIG. 12, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an exemplary embodiment of the present disclosure, in the apparatus and the method for controlling power of the vehicle, the vehicle may normally travel in autonomous driving by supplying the power to the load of the vehicle, even if the power controller or the regulator is failed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling power of a vehicle, the apparatus comprising:
    a first controller configured to generate a first control signal for controlling output of power supplied to at least one vehicle load; and
    a second controller configured to determine whether the first controller is in a normal operation status by monitoring the first controller,
    wherein the first controller transmits the first control signal to the second controller when the first controller is in the normal operation status, and the first controller transmits a second control signal to the second controller when the first controller is not in the normal operation status,
    wherein the first controller transmits a first normal reset signal with low level to the second controller when the first controller is in the normal operation status and transmits the first normal reset signal with high level to the second controller when the first controller is not in the normal operation status,
    wherein the second controller outputs the first control signal to at least one power switch for supplying the power to the at least one vehicle load when the first controller is in the normal operation status and maintains an output status of the first control signal when the first controller is determined as not being in the normal operation status, to maintain supplying the power to the at least one vehicle load when the first controller is not in the normal operation status, and
    wherein the second controller outputs a second normal reset signal to the first controller to read the output status of the second controller corresponding to the first normal reset signal from the first controller when the first controller is in the normal operation status.

2. The apparatus of claim 1, wherein the second controller determines that the first controller is not in the normal operation status when the first controller is reset due to a status of "Watch dog fail" and initialized.

3. The apparatus of claim 1, further comprising:
    a first regulator configured to supply the power to at least one of the first controller or the second controller; and
    a second regulator configured to supply the power to the second controller.

4. The apparatus of claim 3, wherein the second controller is further configured to determine that the first controller is not in the normal operation status to supply the power to the first controller, when failing to receive the power from the first regulator.

5. The apparatus of claim 3, wherein the second controller is further configured to operate by receiving the power from the first regulator when the second regulator is not in the normal operation status, and to determine that the first controller is in the normal operation status.

6. The apparatus of claim 1, wherein the second controller is configured to receive the first control signal from the first controller and to control the power switch, in response to the first control signal, when the first controller is in the normal operation status.

7. The apparatus of claim 1, wherein the power switch is controlled to be turned on or off, in response to the first control signal.

8. A method for controlling power of a vehicle, the method comprising:
generating, by a first controller, a first control signal for controlling output of power supplied to at least one vehicle load;
determining, by a second controller, whether the first controller is in a normal operation status by monitoring the first controller;
transmitting, by the first controller when the first controller is in the normal operation status, the first control signal to the second controller and transmitting, by the first controller when the first controller is not in the normal operation status, a second control signal to the second controller;
transmitting, by the first controller, a first normal reset signal with low level to the second controller when the first controller is in the normal operation status, and transmitting, by the first controller, the first normal reset signal with high level to the second controller when the first controller is not in the normal operation status;
outputting, by the second controller, the first control signal to at least one power switch for supplying the power to the at least one vehicle load when the first controller is in the normal operation status, and controlling, by the second controller, to maintain an output status of the first control signal when the first controller is determined as not being in the normal operation status, to maintain supplying the power to the at least one vehicle load when the first controller is not in the normal operation status; and
outputting, by the second controller, a second normal reset signal to the first controller to read the output status of the second controller corresponding to the first normal reset signal from the first controller when the first controller is in the normal operation status.

9. The method of claim 8, wherein the determining of whether the first controller is in the normal operation status by monitoring the first controller includes:
determining that the first controller is not in the normal operation status when the first controller is reset due to a status of "Watch dog fail" and initialized.

10. The method of claim 8, further comprising:
supplying, by a first regulator, the power to at least one of the first controller or the second controller; and
supplying, by a second regulator, the power to the second controller.

11. The method of claim 10, wherein the determining of whether the first controller is in the normal operation status by monitoring the first controller includes:
determining that the first controller is not in the normal operation status to supply the power to the first controller, when failing to receive the power from the first regulator.

12. The method of claim 10, wherein the determining of whether the first controller is in the normal operation status by monitoring the first controller includes:
operating the second controller by receiving the power from the first regulator when the second regulator is not in the normal operation status; and
determining that the first controller is in the normal operation status.

13. The method of claim 8, wherein the determining of whether the first controller is in the normal operation status by monitoring the first controller includes:
receiving the first control signal from the first controller; and
controlling the power switch, in response to the receiving first control signal, when the first controller is in the normal operation status.

14. The method of claim 8, further comprising:
turning on and off the power switch in response to the first control signal.

15. The method of claim 10, further comprising:
outputting, by at least one of the first controller or the second controller, a regulator enable output signal to each of the first regulator and the second regulator for operating both the first regulator and the second regulator normally.

16. The apparatus of claim 3, wherein at least one of the first controller or the second controller outputs a regulator enable output signal to each of the first regulator and the second regulator for operating both the first regulator and the second regulator normally.

* * * * *